United States Patent [19]
Redfield et al.

[11] Patent Number: 5,519,517
[45] Date of Patent: May 21, 1996

[54] METHOD AND APPARATUS FOR HOLOGRAPHICALLY RECORDING AND REPRODUCING IMAGES IN A SEQUENTIAL MANNER

[75] Inventors: Stephen R. Redfield, Austin, Tex.; Richard D. Rallison, Paradise, Utah

[73] Assignee: Tamarack Storage Devices, Austin, Tex.

[21] Appl. No.: 110,087

[22] Filed: Aug. 20, 1993

[51] Int. Cl.⁶ .................................................. G11C 13/04
[52] U.S. Cl. ........................ 359/22; 359/29; 365/125; 369/103
[58] Field of Search .................................. 359/3, 22, 26, 359/29; 365/125; 369/103

[56] References Cited

U.S. PATENT DOCUMENTS

| | | | |
|---|---|---|---|
| 3,657,473 | 4/1972 | Corcoran | 369/103 |
| 3,758,187 | 9/1973 | Thomas et al. | 369/103 |
| 3,947,640 | 3/1976 | Ruell et al. | 359/26 |
| 4,094,011 | 6/1978 | Nagao | 359/29 |

OTHER PUBLICATIONS

"Gigabit/Second Recording with Holography", Bardos et al, Electro–Optical Systems Design Confrence, Sep. 1973, 90–101.

Primary Examiner—Samuel A. Turner
Attorney, Agent, or Firm—Gregory M. Howison

[57] ABSTRACT

A tape cartridge (12) is provided for storing holographic recordings in a longitudinal holographic storage media tape (14). The tape (14) is comprised of a thin holographic storage media such as a photopolymer. A laser (54) is operable to generate a coherent light beam, which is then positioned on a given row of storage regions (42) on the surface of the tape (14). A positioning/angle multiplexing device (90) is operable to both position a reference beam (60) and a data beam (62) onto a select one of the storage regions in a given row on the surface of the tape (14). The tape (14) is incremented a row at a time for each scan operation wherein both the reference and the data beams during a Write operation, and only the reference beam during the playback operation, are moved along a given row. The spinning polygon mirror (56) is utilized to provide both positioning along a given row and angle multiplexing in a select storage region, with the optic system removing the angular information from the data beam (62). Data is superimposed on the data beam by an SLM (76).

60 Claims, 4 Drawing Sheets

METHOD AND APPARATUS FOR HOLOGRAPHICALLY RECORDING AND REPRODUCING IMAGES IN A SEQUENTIAL MANNER

TECHNICAL FIELD OF THE INVENTION

The present invention pertains in general to mass storage devices, and more particularly, to a mass storage device utilizing holographic storage techniques in a thin media, the thin media configured on a reel-to-reel tape system.

BACKGROUND OF THE INVENTION

As the need for increased data storage changes, the search for higher density, faster access memory technologies also increases. One of these, holographic data storage, provides the promise for increased access to higher density data. The techniques for realizing such storage typically utilize some type of storage media, such as photorefractive crystals or photopolymer layers, to store 3-D "stacks" of data in the form of pages of data. Typically, coherent light beams from lasers are utilized to perform the addressing, writing and reading of the data from the storage media by directing these beams at a specific region on the surface of the media. Writing is achieved by remembering the interference pattern formed by these beams at this region. Reading is achieved by detecting a reconstructed light beam as it exits the storage medium, the data then being extracted therefrom. Addressing is achieved by the positioning of the laser beams, and this is typically done through the mechanical movement of mirrors or lenses; however, the storage media itself can be moved relative to fixed laser beams.

One application for mass storage devices is that with respect to full-motion video. At present the VCR technology utilizes a magnetic recording on a tape, which tape is then passed over a record/playback head to read the information encoded in the magnetic fields on the tape. One disadvantage to this type of media is that the recording is weakened over time and, in fact, these types of recordings are seldom adequate for long-term archival purposes. With the advent of the CD-ROM digital storage device. Digital storage of video information has become possible. However, most full motion video applications are directed toward movies and these typically require between one to three hours of playback time. The video information required to reproduce a long-playing video in full-motion color is typically in excess of one gigabyte uncompressed. Even when compressed by conventional standards, a full-length, digitally stored feature requires a 12" disk to store all of the information. Through the use of new compression algorithms, it has been possible to compress the data such that a full hour of full-motion color video can be stored on a 5¼" disk, which is a relatively standard disk in the industry. However, this is still inadequate since the disk is not normally removable. Further quality is lost due to the compression algorithm.

Holographic storage devices yield relatively fast access times and allow significantly increased storage over a given area due to the stacking of pages of information within individual storage regions in the media. Further, since the media may be removable, it can act as a container for video movies. However, even with present compression technologies, a large surface area is required. There therefore exists the need to combine the increased storage capacity provided by the holographic storage technology with conventional media tape technology which allows a large amount of information to be contained in a single and portable cartridge.

SUMMARY OF THE INVENTION

The present invention disclosed and claimed herein comprises a holographic storage system. The holographic storage system includes a holographic storage media having top and bottom surfaces with a plurality of storage regions associated therewith. Each of the storage regions is operable to store holographic recordings of images or pages of data, and the storage regions are arranged in parallel rows in the storage media. Each row has the associated storage regions spaced a predetermined distance apart along the row. A coherent light source is operable to generate a coherent light beam, which light beam is then directed as a reference beam by a reference beam directing system to a select one of the storage regions at a predetermined angle and in a select one of the rows. This results in the generation of a reconstructed data beam when a holographic recording is appropriately disposed in the storage region. A control system is operable to control the directing operation to sequentially access a plurality of storage regions in a select one of the rows by controlling the directing system to first direct the reference beam to one of the storage regions for a sufficient time to generate the reconstructed data beam, and then direct the reference beam to another of the select ones of the storage regions. A detector is provided to detect the data contained in the reconstructed data beam.

In another aspect of the present invention, a recording system is provided for operating in a recording mode to record the holographic recordings in the holographic storage media. The recording system includes a beam splitter for splitting the coherent light beam into a first beam or reference beam for input to the reference beam directing system and a second light beam or data beam operable to have data superimposed thereon. A data encoder or spatial light modulator is operable to superimpose data on the data beam to provide the data to be recorded. A data beam directing system directs the data beam to intersect with the reference beam in a selected one of the storage regions. The interference of the data beam and the reference beam results in an interference grating which is recorded having stored therein information corresponding to the data on the data beam.

In a further aspect of the present invention, the holographic storage media is a flexible storage media that is configured as a longitudinal tape having two edges. The rows of storage regions are disposed in parallel at an angle relative to the edges. The reference beam directing system is comprised of a steering device for steering the reference beam along a given row when the row is disposed in a longitudinal window. A tape movement device is operable to incrementally move the tape such that adjacent rows are sequentially presented to the window. The controller is operable to control the steering system to sequentially access all of the storage regions in a given one of the rows disposed in the window and, thereafter, control the tape movement device to move to the next sequential row.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
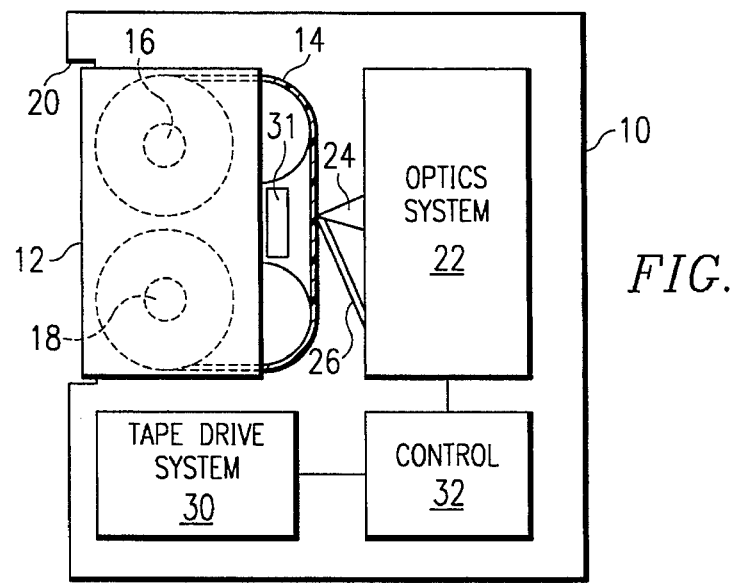
FIG. 1 illustrates a diagrammatic view of a holographic tape drive system.

Referring now to FIG. 1, there is illustrated a diagrammatic view of a tape drive system 10 for carrying a holographic tape cartridge 12. The holographic tape cartridge 12 is operable to carry internal thereto a holographic storage tape 14 which is comprised of a continuous layer of photopolymer material which is wound onto two separate reels 16 and 18 internal to the cartridge 12. This is a conventional winding apparatus that is found on most VCR tapes and audio tapes. The tape cartridge 12 is inserted into a slot 20 within the tape drive 10 and then interfaced with an optics system 22. The optics system 22 is operable to generate, during a recording operation, a data beam 24 and a reference beam 26 and, during a playback operation, only the reference beam 26. As will be described hereinbelow, the optics system 22 is operable to scan both the data beam 24 and the reference beam 26 in tandem during a record operation, and the reference beam 26 only during a playback operation, across the surface of the tape 14. The set of beam positions describes a line. Therefore, rows of storage regions are stored on the tape 14, which are then incrementally passed under the intersection line of the reference beam 26 and data beam 24. A tape drive system 30 is provided for controlling the drive operation of the tape cartridge 12. In general, the drive operation is an incremental drive operation such that each row is presented to the optics system 22, that row scanned, and then the next row presented. Other than the incremental operation, the pickup one of the reels 16 and 18 is typically held in a tension position with the remaining reels 16 and 18 allowed to operate in an idle mode. The tape drive system 30 and the optics system 22 are controlled by a control device 42. A detector 31 is disposed on the opposite side of the tape 14 from the optic system 22. Detector 31 is utilized during a Read operation to detect the data in the reconstructed data beam, as will be described hereinbelow.

Figure 2A:
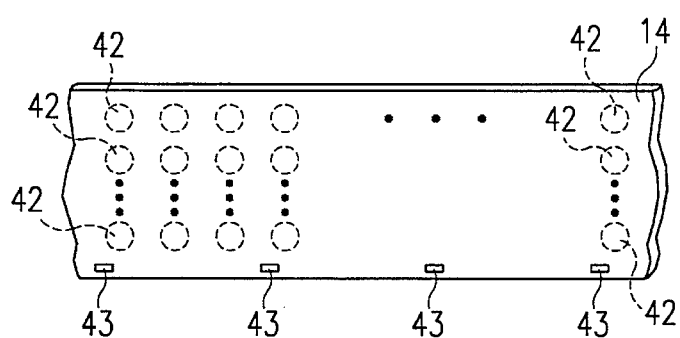
FIGS. 2a and 2b illustrate top and side views, respectively, of the tape media.

Referring now to FIG. 2a, there is illustrated a top view of one section of the tape media. The tape media utilizes a photopolymer, which photopolymer is a material that undergoes photo-induced polymerization. These compositions have been used to form conventional holograms. These are typically fabricated from a gel based composition which is photo-reactive. When two laser beams intersect in the gel to set up an interference pattern, this causes selective polymerization within the material. These compositions typically contain a polymeric binder, a liquid ethylinically unsaturated monomer and a photoinitiator system. Typically, the layer of gelatin is spun onto a substrate such as glass to provide a thin coating of approximately 20 microns. A capping layer of material such as Mylar® is then disposed over the gelatin layer. This provides a relatively good optical surface on the upper surface of the gelatin layer, and the glass substrate provides a high quality optical surface on the bottom surface of the gelatin layer.

Figure 2B:
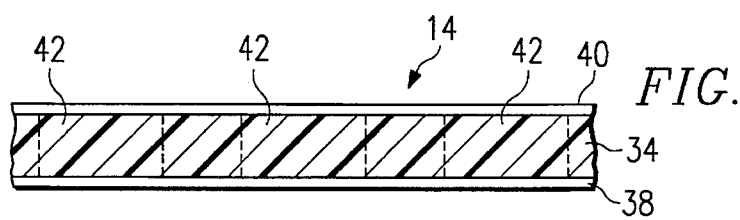

In the preferred embodiment, the media is manufactured by DuPont as DuPont 705 polymer. It is approximately ½" wide (VHS width) and is approximately twenty feet long. The thickness of the preferred embodiment will be 60 µm of photopolymer material. As illustrated in FIG. 2b, a layer of photopolymer 34 is sandwiched between two Mylar® layers 38 and 40. Each of these is approximately 40 µm in thickness and may exhibit low birefringence.

Figure 2C:
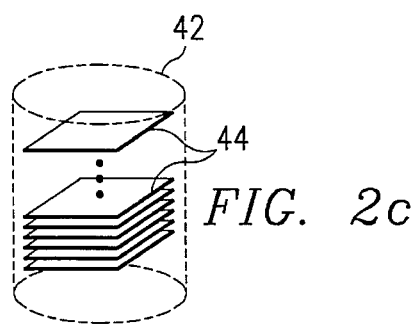
FIG. 2c illustrates a detail of the stacks of pages in a given storage region.

The media can be viewed as having disposed thereon rows perpendicular to the longitudinal axis of the tape, each of the rows comprised of a plurality of storage regions 42, each of the storage regions 42 operable to store a plurality of "stacks" of pages 44. This is illustrated in FIG. 2c. However, it should be understood that the rows of storage regions need not be disposed perpendicular to the edges of the tape—they could be disposed at any angle relative thereto. Each of the stacks of pages 44 is comprised of an interference grating which is created with angle multiplexing. In angle multiplexing, the angle of the reference beam relative to the angle of the original data beam results in an interference grating with a particular underlying spatial frequency being stored in the storage region 40. The angle of the reference beam relative to the data beam is referred to as the "Bragg" angle. During a Read or data reconstruction operation, it is only necessary to direct the reference beam onto the storage region 40 at the same Bragg angle to reconstruct that page of information. The reconstructed page of information will then be contained in a reconstructed data beam that exits the opposite side of the storage media 14. Although the stacks 44 are illustrated as being at different locations in the illustration of FIG. 2c, it should be understood that the inference gratings actually overlap each other and occupy substantially the same space in the storage region 42. It is the Bragg angle and the associated Bragg selectivity that allows the reconstruction of a specific holographic recording to occur.

As illustrated in FIG. 2b, the storage regions 42 are disposed a predetermined distance apart. This is necessary to ensure data integrity wherein, during the record operation, energy from a given data beam or reference beam does not "bleed" over into the other regions. The energy dispersion across the data beam has a predetermined profile, depending upon whether it is a data beam or reference beam, resulting in some energy existing a small distance away from the center of the beam, which energy decreases as the distance from the center of the data beam increases. However, some of this energy can be at a sufficient level to interfere with recordings in immediately adjacent regions. By separating the storage regions 42 by a predetermined distance, the integrity of the data can be maintained.

A plurality of fiduciary marks 43 are disposed along one edge of the tape 14. The fiduciary marks 43 are openings that are disposed in the tape 14 during manufacture thereof. These fiduciary marks 43 are utilized for registration purposes, as described hereinbelow.

The holograms in the preferred embodiment are stored for each page are in an array 256×256 bits with 22 page stacks, such that 22 pages of information are stored in each storage region 42. The following are representative specifications for the tape and the operation thereof:

| Media: | |
|---|---|
| Capacity | 13.2 G bytes (6 m tape) |
| Tape width | 12.7 mm (½ in) |
| Tape length | 6000 mm (236 in) |
| Bending radius | 25 mm (1 in min) |
| Physical size | VHS cartridge size |
| Recording Parameters: | |
| Page dimensions | $256^2$ bit array |
| Page capacity (raw) | 8K bytes |
| Stack size | 24 Pages (min) |
| Stack capacity | 194K bytes |
| Stack diameter | 0.7 mm (0.0276 in) |
| Stack packing factor | 70% |
| Stacks per row | 12 stacks |
| Row width | 1 mm (0.039 in) |
| Row active area | 11.4 mm$^2$ (0.0176 in$^2$) |
| Row capacity (raw) | 2.3 Mbytes |
| page size | 256 × 256 bits |
| spot diameter | 0.7 mm |
| media fill factor | 0.7 |
| row step rate | 0.7 step/sec |
| Area density (raw) | 200 KB/mm$^2$ (129 MB/in$^2$) |
| Drive: | |
| Data rate (in/out) | 21 Mbits/sec (2.6 MBPS) |
| laser wavelength | 690 nm |
| Tape play speed | 0.7 mm per sec |
| Weight | 20K power-on hours |

Figure 3:
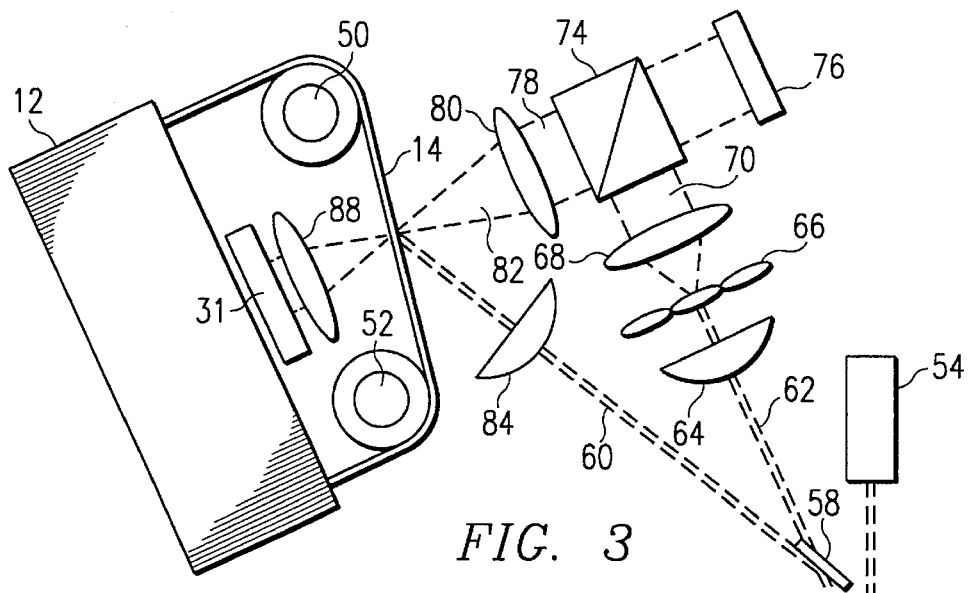
FIG. 3 illustrates a top diagrammatic view of the optics system for generating both the data and reference beams.

Referring now to FIG. 3, there is illustrated a diagrammatic view of the optic system 22. The tape 14 is stretched out over two idler rollers 50 and 52, such that a clear area of the tape 14 is presented to the optics system 22. The optics system 22 contains a laser 54, which is typically comprised of, for example, a diode pumping YAG (yttrium aluminum garnet) laser with a low power output around 80 milliwatts, with a wavelength in the range of 532 nanometers. The output beam of the laser 54 is directed toward a spinning polygon mirror 56, which mirror 56 is operable to provide both the angle multiplexing for each given storage region 42 and also the stepping operation along a given row of storage regions 42. As will be described hereinbelow, the spinning polygon mirror 56 has a plurality of reflective facets which are disposed at a different angle for the stepping operation. The rotating operation of the mirror provides the angle multiplexing for each facet and associated storage region in a row, whereas changing facets increments to the next storage region in a row.

The output of the laser 54 is reflected off of the surface of one of the facets of the spinning polygon mirrors 56 and directed toward the beam splitter 58. The beam splitter 58 is operable to split the beam into a reference beam 60 and an unencoded data beam 62. However, both the reference beam 60 and the unencoded data beam 62 at this point have both positioning and page addressing information associated therewith. The positioning information is required for both the data beam 62 and the reference beam 60, but the page addressing information is only important relative to the reference beam 60. Therefore, this must be removed from the unencoded data beam 12. The unencoded data beam 62 is passed through a reference deflection removing lens 64 and then input to a lens array 66, which is a linear lens array having a plurality of small lens for each stack site on the tape. A preferred embodiment of this lens array 66 is a linear array of GRIN Rods. The linear lens array is operable to expand the unencoded data beam 62 and then input it to a collimating lens 68. The output of the collimating lens 68 is an expanded beam 70. The expanded beam 70 is directed toward a polarizing beam splitter, which is operable to direct the expanded beam 70 to a reflective polarization rotating Spatial Light Modulator (SLM) 76. The SLM 76 receives data from a computer system (not shown) and then this data is superimposed on the data beam by the SLM 76, creating a bit pattern of rotated and unrotated spots in the conventional manner. This pattern of spots represents the bits on the page to be stored. The SLM 76 then reflects this now encoded data beam with the polarization thereof rotated or rotated according to the data pattern back to the polarizing beam splitter 74, which allows the rotated spots of the encoded data beam to pass therethrough as an expanded encoded data beam 78. The encoded expanded data beam 78 is then passed through a focusing lens 80 which then focuses the beam onto a select portion of the surface of the tape 14 as a focused beam 82, which is the Fourier transform of the pattern of spots or pages. Again, as described above, the portion of the optics system that is associated with the data portion is operable to position the data beam to one of the plurality of storage regions 42 in a given row on the surface of the tape 14 and also superimpose data on that data beam.

The reference beam 60 is operable to be passed through a reference beam directing lens 84, which then directs the beam onto the storage region 42. The spinning polygon mirror 56 is at one focal point of the reference beam directing lens 84 and the tape media 14 is at the other end thereof. As described above, the spinning polygon mirror is operable to provide the positioning relative to the select one of the storage regions 42 in the row with the lens operable to account for the spatial difference for each angle of the reference beam, the spatial difference resulting in an angular deviation, as will be described hereinbelow. During a data reconstruction operation, the reconstructed data is output to an imaging lens 88 and then onto the detector array 31.

Figure 4:
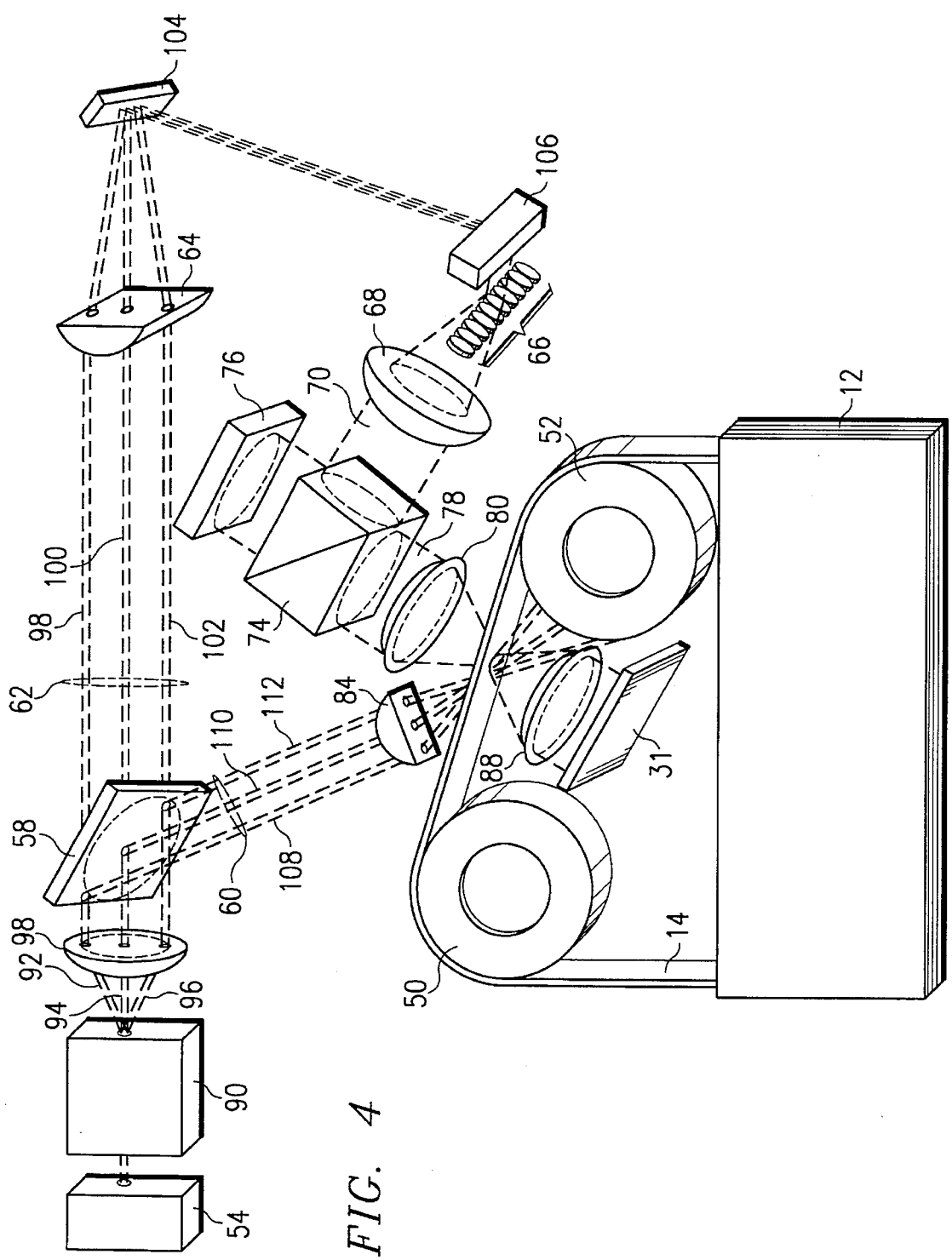
FIG. 4 illustrates a perspective view of the beam dispersion.

Referring now to FIG. 4, there is illustrated a diagrammatic view of the system of FIG. 3, illustrating a more compact layout in a three-dimensional view for the system of FIG. 3. The drive mechanism and spinning polygon 56 are illustrated in structure 90, which is operable to output separate light beams at different angles, three of which are shown, these being represented as light beams 92, 94 and 96 which should be understood as being generated at different times. These are directed toward a lens 98, which is operable to redirect the beams 92, 94 and 96 in a parallel configuration. These are directed to the beam splitter 58, as described above, to split the three beams 92, 94 and 96 output by the lens 98 into the reference beam 60 and the unencoded data beam 62.

The unencoded data beam 62 represents three separate unencoded data beams 98, 100 and 102, corresponding to the respective beams 92, 94 and 96. These are then directed toward the lens 64, which is operable to direct them to the lens array 66. In the embodiment of FIG. 4, each of the beams 98–102, when generated, are passed through the lens 64 and then reflected from a minor 104 to a mirror 106 and then to the lens array 66. The lens array 66 is illustrated as being a plurality of gradient index lenses, which are cylindrical lenses, one lens for each storage region 42 in a row on the surface of the tape 14. The lens 64 is operable to focus each of the beams 98–102 onto a select one of the lens in the array 66. This then results in generation of a collimated light beam 70 output from the lens 68 after expansion by the lens 66 which illuminates the SLM 76. It can be seen that for any angular position of the beams 92, 94 and 96, the optics, involving lens 64, the lens array 66 and the lens 68, changes the angular deviation to a slight displacement of the collimated light beam 70. If this beam overfills the SLM 76, this would present no problem.

The reference beam 60 is illustrated with three different positions associated with beams 108, 110 and 112, corresponding to the beams 92, 94 and 96, respectively. Each of the beams 108, 110 and 112, when generated, are directed to the lens 84, which then directs the beams to the surface of the tape 14, each of the redirected beams for each of the beams 108, 110 and 112 having a different angle relative to the surface of the tape 14, each of these angles corresponding to a different Bragg angle when interfered with the data beam. During a Read operation, each of the redirected beams output by the lens 84 passes through the same storage region 42, with only the interference grating stored for that Bragg angle being reconstructed. The information associated with remaining interference gratings will not be reconstructed.

Figure 5A:
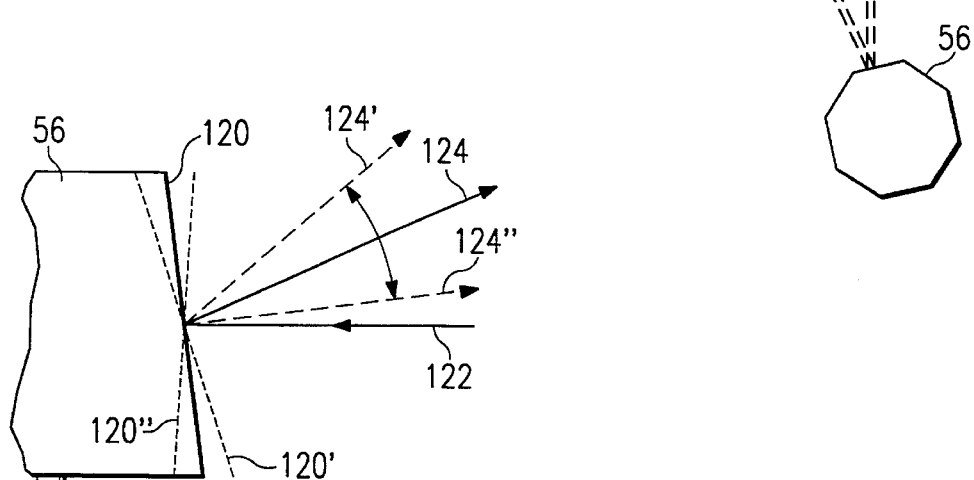
FIG. 5a illustrates a detail of one surface of a polygon mirror of FIG. 5.
Figure 5:
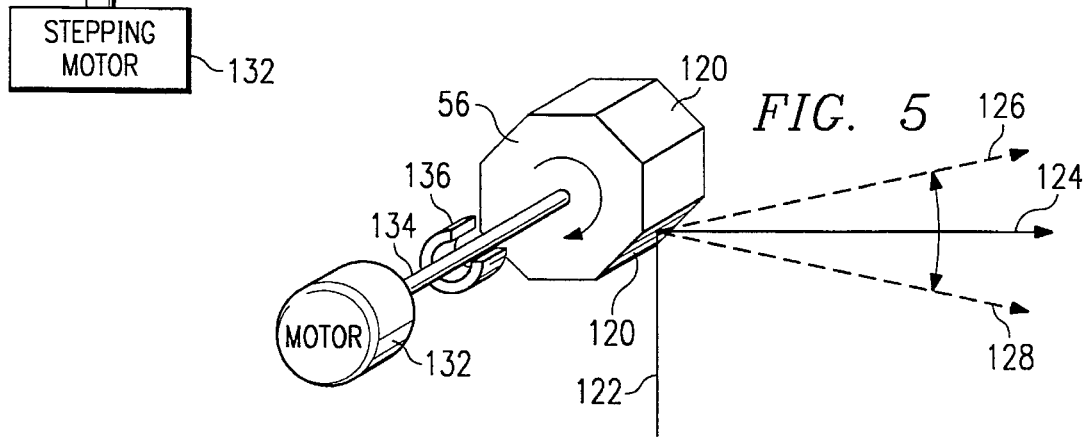
FIG. 5 illustrates a detail of the spinning polygon mirror.

Referring now to FIG. 5, there is illustrated a detail of the spinning polygon mirror 56. The polygon mirror 56 is illustrated as having a plurality of facets 120, there being illustrated eight facets 120. Each of the facets 120 is associated with a single one of the storage regions 42 in a given row on the tape 14. For each of the given facets 120, an impinging coherent light beam 122 generated by the laser 54 will be reflected from the surface of the facet 120 at a predetermined angle as a reflected coherent light beam 124. As the polygon mirror 56 rotates, the angle of the reflected beam 124 will vary between two extrema 126 and 128. This will provide the angles necessary for multiplexing for both the read and record operations. As the polygon mirror 156 rotates, the angle varies from the extrema 126 to the extrema 128. Upon impinging upon the next adjacent facet 120, the angle again varies between the extrema, but the reflected beam 124 is now reflected at a different angle relative to the rotational axis of the mirror 56.

Referring now to FIG. 5a, there is illustrated a cross-sectional view of one of the facets 120. There are also illustrated in phantom lines two additional facets 120' and 120". When the facet 120 is present, the reflective wave 124 will be present at a predetermined angle relative to the rotational axis of the mirror 56. When the facet 120' is presented to the impinging beam 122, the angle will increase, resulting in the reflected beam 124'. Similarly, when the facet 120" is presented, the reflected wave 124" will result, being at a smaller angle than the reflected wave 124.

The mirror 56 is rotated by a polygon stepping motor 132, which is operable to interface with the mirror 56 through the rotational center thereof through a shaft 134. The shaft 134 has a shaft position detector 136 associated therewith to determine the position of the shaft. Typically, this is in the form of a fixed element that is adhered to the shaft 134 and then an optical device that detects the passing of this fixed element. These are typically optical detectors.

Figure 6:
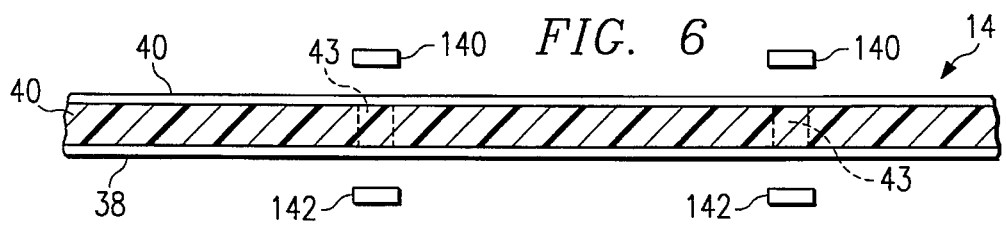
FIG. 6 illustrates the detector system for detecting the position of the fiduciary mark on the tape.

Referring now to FIG. 6, there is illustrated a side view of the tape media 14 as it passes between an optical detector array comprised of a plurality of emitters 140 and a plurality of corresponding detectors 142. Each of the emitters 140 is operable to emit light at a predetermined wavelength which, when the fiduciary mark 43 passes thereby, allows the light to pass therethrough to the corresponding detector 142. This indicates the presence of the fiduciary mark. As described above, the fiduciary mark 43 is a registration which is inherent to the tape media. This mark is utilized during recording such that, during playback, the system can be spatially synchronized. The detectors 142 and the emitters 140 are arranged in a configuration such that when the fiduciary mark 43 passes between one of the detectors 142 and the emitters 142, an indication is provided as to the position of the row of storage regions relative to the reference and data beams. There will be a virtual line over which the reference beams and data beams can be scanned. Whenever the tape 14 is aligned correctly, the fiduciary mark 43 will be directly underneath the emitter 140. When the positioning is incorrect, it will not be directly thereunder.

Figure 7:
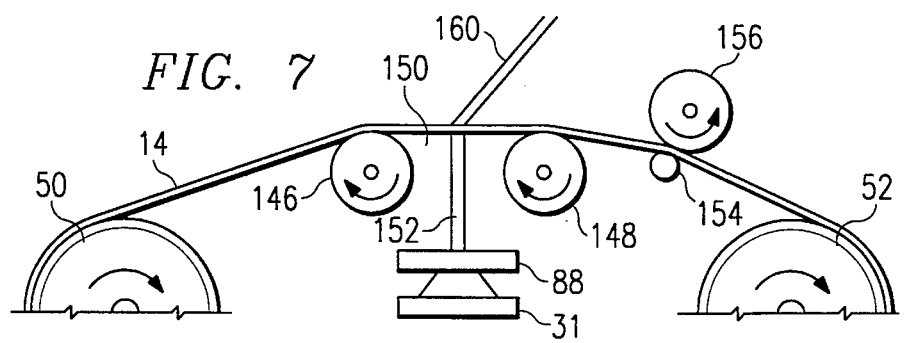
FIG. 7 illustrates a detail of the idler system for carrying the tape in the machine.

Referring now to FIG. 7, there is illustrated a detailed diagram of the tape feeding mechanism. A tape 14 is passed from the idler roller 50 to a smaller idler roller 146. The tape is passed from the idler roller 146 to a small idler roller 148. The idler rollers 146 and 148 are spaced relatively close together with an opening or space 150 disposed therebetween. This opening 150 is of sufficient width to allow a reconstructed data beam 152 to pass therebetween to the imaging lens 88 and, subsequently, to the detector 31. The idler roller 148 will then pass the tape 14 to a nip between a drive pinion 154 and an idler roller 156. The drive pinion 154 is operable to provide the drive to the tape which then passes the tape 14 from the nip of the rollers 154 and 156 to the idler roller 52 and, subsequently, to the take-up reel 18 (not shown). All that is required to generate the reconstructed data beam 152 is for a reference beam 160 to be directed at the surface of the tape 14 and one of the storage regions 42 along a given row at a Bragg angle for which an interference grating is stored in that storage region. It can be seen that the tape 14 does not have to ride over any type of surface, since some vertical movement of the tape 14 can be tolerated. Furthermore, it is not necessary to have the tape adjacent a metallic surface, such as a recording/playback head, as is the case with a VHS system, such that very little wear on the tape results.

Figure 8:
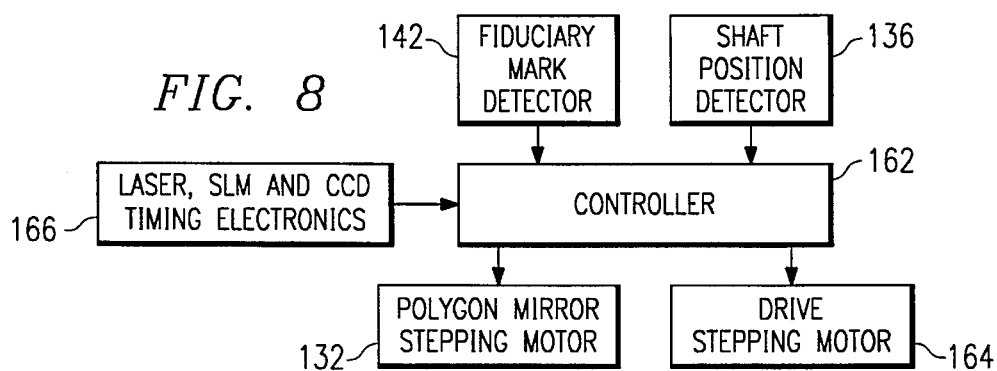
FIG. 8 illustrates a block diagram of the control system.

Referring now to FIG. 8, there is illustrated a block diagram of the control system for driving the tape and controlling the various drive motors, positioning, etc. A controller 162 is provided for receiving signals from the fiduciary mark detector 142 and the shaft position detector 136. The controller 162 is operable to control the drive stepping motor 164 such that a given row of storage regions is correctly placed beneath the reference beam during a playback operation and beneath both the reference and data beams during the record operation. The drive stepping motor 164 is operable to then increment a single row for each full rotation of the spinning polygon mirror 56. Once the mirror 56 is rotated, the drive stepping motor 164 increments to the next row, and again rotates. However, if the fiduciary mark 43 is not detected, the drive stepping motor 164 will be placed in an adjustment mode wherein the motor will be fine-stepped. The motor 164 can have as many as one hundred steps to achieve this position. The controller 162 also controls the position of the polygon stepping motor 132 insuring it is in sync with the timing electronics.

Figure 9:
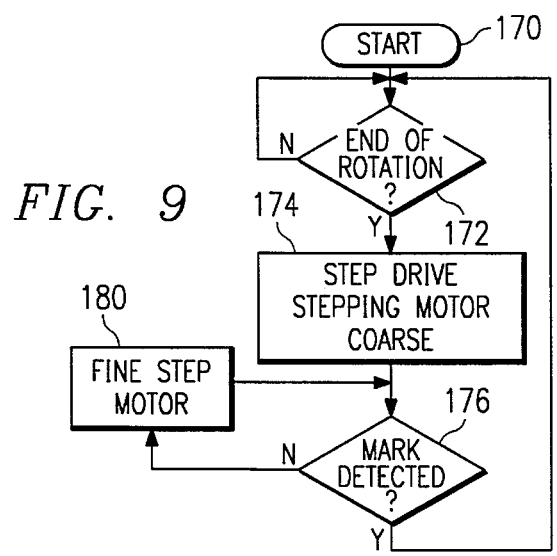
FIG. 9 illustrates a flowchart depicting the operation of the control system of FIG. 8.

Referring now to FIG. 9, there is illustrated a flowchart depicting the operation of the controller 162, this is initiated at start block 170. The program first goes to decision block 172 to determine from the shaft position detector 136 if the mirror is at the beginning of a rotation, i.e., at one end of the row. If so, the program goes to function block 174 to step the motor a single row, this being a coarse stepping operation. However, if the end of the rotation has not occurred, the program will take the "N" path back to the input of decision block 172, once the motor has been stepped a single row, the program then goes to decision block 176 to determine if the fiduciary mark was detected. If so, the program will take the "Y" path to decision block 172. However, if the mark has not been detected, the program proceeds from decision block 176 to function block 180 to fine-step the motor and then back to the decision block 176 until the mark is detected. This operation can be an operation wherein the motor is stepped forward and backwards to find the closest fiduciary mark. This is a minor adjustment which is performed at intermediate periods.

In summary, there has been provided a holographic tape storage system, including media which is comprised of a thin holographic media such as a photopolymer, that is disposed in a tape cartridge. Holographic information is stored in the form of pages of information, each page comprising a recorded interference grating. The storage regions are aligned in rows that are perpendicular to the edge of the tape media. An optics system is provided that is operable to scan each row of storage regions and, in each storage region therein, scan the Bragg angles in that row for the different pages of information stored in each storage region. The tape is ratcheted such that it stops for each scanning operation on a given row.

Although preferred embodiments have been described in detail, it should be understood that various changes, substitutions and alterations can be made therein without departing from the spirit and scope of the invention as defined by the appended claims.

What is claimed is:

1. A holographic storage system, comprising:

a holographic storage media having a top surface and a bottom surface with a plurality of storage regions for storing pages of holographic recordings therein, said storage regions arranged in parallel rows, each row having the associated storage regions spaced a predetermined distance apart along the associated row;

a coherent light source for generating a coherent light beam;

a reference beam directing system for directing, at a predetermined angle, the coherent light beam as a reference beam to a select one of said storage regions in a select one of said rows to adequately illuminate the select one of said storage regions to generate a reconstructed data beam when a holographic recording comprised of an image representing multiple bits of data is disposed in the select one of said storage regions;

a control system for controlling said reference beam directing system to sequentially and incrementally, access a plurality of said storage regions in a select one of said rows by controlling said reference beam directing system to direct said reference beam at one of said storage regions for a sufficient time to generate said reconstructed data beam and then incrementally direct said reference beam to another of the select ones of said storage regions in said row; and a detector for detecting and extracting the image of the multiple bits of data in said reconstructed data beam.

2. The system of claim 1, and further comprising a recording system, said recording system comprising:

a beam splitter for splitting said coherent light beam into a first light beam comprising said reference beam and a second light beam;

a spatial light modulator for superimposing data on said second light beam to form a data beam;

a data directing system operable in a record mode for incrementally directing said data beam to intersect with said reference beam in the selected one of said storage regions, the interference of said data beam and said reference beam recording an interference grating having stored therein information corresponding to said data on said data beam.

3. The system of claim 1, wherein said holographic storage media is comprised of a flexible photopolymer material.

4. The system of claim 1 wherein said holographic storage media is comprised of a flexible longitudinal holographic storage media having first and second longitudinal edges with said rows disposed parallel and at an angle relative to said edges with said control system operable to control said reference beam directing system to incrementally direct said reference beam to the select ones of said storage regions in a given row, and, after accessing each of said plurality of storage regions in said given row, accessing said plurality of storage regions in the next adjacent one of said rows in a sequential manner such that the information stored in substantially all of said rows associated with said plurality of storage regions in a select one of said rows is accessed.

5. The system of claim 4 wherein said control system includes a motive device for incrementally moving said flexible longitudinal holographic storage media relative to said reference beam directing system for at least the movement of said reference beam directing system from one row of said storage regions to an adjacent row of said storage regions.

6. The system of claim 4 wherein said rows of said storage regions are disposed substantially perpendicular to the edges of said flexible longitudinal holographic storage media.

7. The system of claim 4, wherein said longitudinal media comprises a tape, and wherein said tape is wound on two reels and extends therebetween, said control system operable to feed said tape from one of said reels to the other of said reels.

8. The system of claim 1, wherein the stored pages of holographic recordings are angle multiplexed within each of said storage regions, and wherein said reference beam directing system is operable to vary said predetermined angle to one of a plurality of predetermined angles to access the select ones of said holographic recordings associated therewith.

9. The system of claim 8, wherein said reference beam directing system is operable to direct said reference beam at each of said plurality of angles, each of said plurality of angles associated with a separate one of said stored holographic recordings in said select storage region such that substantially all of said stored holographic recordings in the select one of said storage regions are accessed as a reconstructed data beam.

10. The system of claim 1, wherein said reference beam directing system comprises:

a steering system for steering said reference beam to select ones of said storage regions in a given row; and a ratchet mechanism for moving said holographic storage media incrementally to dispose an entire row of said storage regions in a predetermined window with said steering system operable within said window;

said steering system and said ratchet system controlled by said control system.

11. The system of claim 10, wherein said control system is operable to control said steering system to access all of said storage regions in the one of said rows within said window in a predetermined order prior to controlling said ratchet system to select the next adjacent row.

12. The system of claim 11, wherein said predetermined order comprises moving from the top to the bottom of the one of said rows disposed in said window.

13. A holographic storage system, comprising:

a holographic storage media having a top surface and a bottom surface with a plurality of storage regions for storing pages of holographic recordings therein, said storage regions arranged in parallel rows, each row having the associated storage regions spaced a predetermined distance apart along the associated row;

a coherent light source for generating a coherent light beam;

a beam splitter for splitting said coherent light beam into a first light beam comprising a reference beam and a second light beam;

a spatial light modulator for superimposing an image representing multiple bits of data on said second light beam to form a data beam during a record operation;

a data directing system operable in said record mode for directing said data beam to illuminate a select one of said storage regions in a select one of said rows;

a reference beam directing system for directing, at a predetermined angle, said reference beam, during said record mode to intersect with said data beam in the select one of said storage regions, the interference of said data beam and said reference beam recording an interference grating having stored therein information corresponding to said image of the multiple bits of data on said data beam, said reference beam directing system, during a data reconstruction operation, directing, at a predetermined angle, said reference beam to a select one of said storage regions in a select one of said rows to generate a reconstructed data beam when a holographic recording is disposed in the select one of said storage regions;

a control system for controlling said reference beam directing system during said data reconstruction mode to sequentially incrementally access a plurality of said storage regions in a select one of said rows by controlling said reference beam directing system to direct said reference beam at one of said storage regions for a sufficient time to generate said reconstructed data beam and then incrementally direct said reference beam to another of the select ones of said storage regions in said row;

said control system for controlling said reference beam and data beam directing systems during said record operation to sequentially and incrementally access a plurality of said storage regions in a select one of said rows by controlling said reference beam and data beam directing systems to direct said reference beam and data beam at one of said storage regions to intersect for a sufficient time to form an interference grating therein and then incrementally direct said reference beam and said data beam to another of the select ones of said storage regions in said row; and a detector for detecting and extracting the data in said reconstructed data beam during said data reconstruction mode.

14. The system of claim 13 wherein said holographic storage media is comprised of a flexible longitudinal holographic storage media having first and second longitudinal edges with said rows disposed parallel and at an angle relative to said edges with said control system operable to control said reference beam directing system and said data beam directing system to incrementally direct said reference beam and said data beam during said record mode, and said reference beam only during said data reconstruction mode, to the select ones of said storage regions in a given row, and, after accessing each of said plurality of storage regions in said given row, incrementally accessing said plurality of storage regions in the next adjacent one of said rows in a sequential manner said record mode.

15. The system of claim 14, wherein said control system includes a motive device for incrementally moving said flexible longitudinal holographic storage media relative to said reference beam and said data beam directing systems for at least the movement of said reference beam and said data beam directing systems from one row of said storage regions to an adjacent row of said storage regions.

16. The system of claim 15, wherein said rows of said storage regions are disposed substantially perpendicular to the edges of said flexible longitudinal holographic storage media.

17. The system of claim 14, wherein said longitudinal media comprises a tape, and wherein said tape is wound on two reels and extends therebetween, said control system operable to feed said tape from one of said reels to the other of said reels.

18. The system of claim 13, wherein the stored pages of holographic recordings are angle multiplexed within each of said storage regions, and wherein said reference beam directing system is operable to vary said predetermined angle to one of a plurality of predetermined angles to access the select ones of said holographic recordings associated therewith during said data reconstruction mode and to intersect with said data beam at one of said plurality of predetermined angles during said record mode.

19. The system of claim 18, wherein said reference beam directing system during said data reconstruction mode is operable to incrementally direct said reference beam at each of said plurality of angles, each of said plurality of angles associated with a separate one of said stored holographic recordings in said select storage region such that substantially all of said stored holographic recordings in the select one of said storage regions are incrementally accessed as a reconstructed data beam.

20. The system of claim 13, wherein said reference beam and said data beam directing systems comprise:

a steering system for incrementally steering said reference beam to select ones of said storage regions in a given row during said data reconstruction mode, and incrementally steering said reference beam and said data beam to select ones of said storage regions in a given row during said record mode; and a ratchet mechanism for moving said holographic storage media incrementally to dispose an entire row of said storage regions in a predetermined window with said steering system operable within said window;

said steering system and said ratchet system controlled by said control system.

21. The system of claim 20, wherein said control system is operable to control said steering system to access all of storage regions in the one of said rows within said window in a predetermined order during at least said data reconstruction mode prior to controlling said ratchet system to incrementally select the next adjacent row.

22. The system of claim 21, wherein said predetermined order comprises moving from the top to the bottom of the one of said rows disposed in said window.

23. A holographic storage system, comprising:

a holographic storage media having a top surface and a bottom surface with a plurality of storage regions for storing pages of holographic recordings therein each comprised of an image of multiple bits of data, said storage regions arranged in parallel rows, each row having the associated storage regions spaced a predetermined distance apart along the associated row;

a coherent light source for generating a coherent light beam;

a beam directing system operable for incrementally directing said coherent light beam to adequately and substantially cover and illuminate a select one of said storage regions in a select one of said rows for a predetermined period of time;

a beam splitter for splitting said coherent light beam into a first light beam comprising a reference beam and a second light beam;

a spatial light modulator for superimposing an image representing multiple bits of data on said second light beam to form a data beam during a record mode, and inhibit said second light beam during a data reconstruction mode;

a reference beam angle multiplexing system for imparting one of a plurality of predetermined angles onto said reference beam and, during said record mode, to intersect with said data beam in the select one of said storage regions at the one of said plurality of predetermined angles, the interference of said data beam and said reference beam at the one of said predetermined angles recording an associated interference grating having stored therein information corresponding to said data on said data beam, said reference beam angle multiplexing system, during a data reconstruction operation, imparting one of said predetermined angles to said reference beam to select the one of said recordings in said select storage region associated with the one of said predetermined angles to generate a reconstructed data beam;

a control system for controlling said beam directing system to sequentially and incrementally access a plurality of said storage regions for said predetermined amount of time in a select one of said rows and controlling said reference beam angle multiplexing system to sequentially and incrementally impart one of said plurality of predetermined angles to said reference beams for said predetermined amount of time while directed at the select one of said storage regions to sequentially generate said reconstructed data beam; and a detector for detecting and extracting the data in said reconstructed data beam during said data reconstruction mode.

24. The system of claim 23 wherein said holographic storage media is comprised of a flexible longitudinal holographic storage media having first and second longitudinal edges with said rows disposed parallel and at an angle relative to said edges with said control system operable to control said beam directing system such that said reference beam and said data beam during said record mode, and said reference beam only during said data reconstruction mode, are incrementally directed to the select ones of said storage regions in a given row for said predetermined amount of time, and, after accessing each of said plurality of storage regions in said given row, accessing said plurality of storage regions in the next adjacent one of said rows in a sequential and incremental manner.

25. The system of claim 24 wherein said control system includes a motive device for incrementally moving said flexible longitudinal holographic storage media relative to said beam directing system for at least the movement of said beam directing system from one row of said storage regions to an adjacent row of said storage regions.

26. The system of claim 24 wherein said rows of said storage regions are disposed substantially perpendicular to the edges of said flexible longitudinal holographic storage media.

27. The system of claim 24, wherein said longitudinal media comprises a tape, and wherein said tape is wound on two reels and extends therebetween, said control system operable to incrementally feed said tape from one of said reels to the other of said reels.

28. The system of claim 23, wherein said beam directing system comprises:

a steering system for incrementally steering said coherent light beam to select ones of said storage regions in a given row for said predetermined amount of time; and a ratchet mechanism for moving said holographic storage media incrementally to dispose an entire row of said storage regions in a predetermined window with said steering system operable within said window;

said steering system and said ratchet system controlled by said control system.

29. The system of claim 28, wherein said control system is operable to control said steering system to incrementally access all of said storage regions in the one of said rows within said window in a predetermined order prior to controlling said ratchet system to select the next adjacent row.

30. The system of claim 29, wherein said predetermined order comprises moving from the top to the bottom of the one of said rows disposed in said window.

31. A method for accessing holographic recordings in a holographic storage system, comprising the steps of:

providing a holographic storage media having a top surface and a bottom surface with a plurality of storage regions for storing pages of holographic recordings therein and each comprised of an image representing multiple bits of data, the storage regions arranged in parallel rows, each row having the associated storage regions spaced a predetermined distance apart along the associated row;

generating a coherent light beam;

incrementally directing, at a predetermined angle, the coherent light beam as a reference beam to a select one of the storage regions in a select one of the rows for a predetermined amount of time to generate a reconstructed data beam when a holographic recording is disposed in the select one of said storage regions;

controlling the step of directing the reference beam to sequentially and incrementally access a plurality of the storage regions in a select one of the rows by directing the reference beam at one of the storage regions for said predetermined amount of time to generate the reconstructed data beam and then incrementally directing the reference beam to another of the select ones of the storage regions in the row; and detecting and extracting the data in the reconstructed data beam after being generated for said predetermined amount of time.

32. The method of claim 31, and further comprising the steps of:

splitting the coherent light beam into a first light beam comprising the reference beam and a second light beam;

superimposing data on the second light beam to form a data beam;

in a record mode, incrementally directing the data beam to intersect with the reference beam in the selected one of the storage regions, the interference of the data beam and the reference beam recording an interference grating having stored therein information corresponding to the data on the data beam.

33. The method of claim 31, wherein the holographic storage media is comprised of a flexible photopolymer material.

34. The method of claim 31 wherein the holographic storage media is comprised of a flexible longitudinal holographic storage media having first and second longitudinal edges with the rows disposed parallel and at an angle relative to the edges with the step of controlling operable to incrementally directing the reference beam to the select ones of the storage regions in a given row to access the select storage region, and, after accessing each of the plurality of storage regions in the given row, incrementally accessing the plurality of storage regions in the next adjacent one of the rows in a sequential manner such that the information stored in substantially all of the rows associated with the plurality of storage regions in a select one of the rows is accessed.

35. The method of claim 34 wherein the step of controlling is operable to incrementally move the flexible longitudinal holographic storage media relative to the reference beam from one row of the storage regions to an adjacent row of the storage regions.

36. The method of claim 34 wherein the rows of the storage regions are disposed substantially perpendicular to the edges of the flexible longitudinal holographic storage media.

37. The method of claim 34, wherein the longitudinal media comprises a tape, and wherein the tape is wound on two reels and extends therebetween, the step of controlling operable to incrementally feed the tape from one of the reels to the other of the reels.

38. The method of claim 31, wherein the stored pages of holographic recordings are angle multiplexed within each of the storage regions, and wherein the step of directing is operable to incrementally direct the reference beam at one of a plurality of predetermined angles to access the select one of the holographic recordings associated therewith.

39. The method of claim 38, wherein the step of directing is operable to incrementally direct the reference beam at each of the plurality of angles, each of the plurality of angles associated with a separate one of the stored holographic recordings in the select storage region such that substantially all of the stored holographic recordings in the select one of the storage regions are incrementally accessed as a reconstructed data beam.

40. The method of claim 31, wherein the step of incrementally directing the reference beam comprises:

incrementally steering the reference beam to select ones of the storage regions in a given row; and moving the holographic storage media incrementally to dispose an entire row of the storage regions in a predetermined window with the step of steering operable within the window.

41. The method of claim 40, wherein the step of controlling is operable to control the step of steering to incrementally access all of the storage regions in the one of the rows within the window in a predetermined order prior to controlling the step of moving to select the next adjacent row.

42. The method of claim 41, wherein the predetermined order comprises moving from the top to the bottom of the one of the rows disposed in the window.

43. A method for storing and accessing holographic recordings in a holographic storage system, comprising the steps of:

providing a holographic storage media having a top surface and a bottom surface with a plurality of storage regions for storing pages of holographic recordings therein each comprised of an image representing multiple bits of data, the storage regions arranged in parallel rows, each row having the associated storage regions spaced a predetermined distance apart along the associated row;

generating a coherent light beam;

splitting the coherent light beam into a first light beam comprising a reference beam and a second light beam:

superimposing data on the second light beam to form a data beam during a record operation;

in the record mode, directing the data beam to substantially illuminate only a select one of the storage regions in a select one of the rows;

incrementally directing, at a predetermined angle, the reference beam, during the record mode to intersect with the data beam in the select one of the storage regions for a first predetermined amount of record time; the interference of the data beam and the reference beam recording an interference grating having stored therein information corresponding to the data on the data beam, and, during a data reconstruction operation, incrementally directing, at a predetermined angle, the reference beam to a select one of the storage regions in a select one of the rows for a second predetermined amount of playback time to generate a reconstructed data beam when a holographic recording is disposed in the select one of the storage regions;

controlling the step of directing during the data reconstruction mode to incrementally and sequentially access a plurality of the storage regions in a select one of the rows by directing the reference beam at one of the storage regions for said playback time to generate the reconstructed data beam and then incrementally directing the reference beam to another of the select ones of the storage regions in the row for said playback time;

controlling the step of directing to incrementally and sequentially access a plurality of the storage regions in a select one of the rows by directing the reference beam and data beam at one of the storage regions to intersect for said record time to form an interference grating therein and then incrementally direct the reference beam and data beam to another of the select ones of the storage regions in the row for said record time; and detecting and extracting the data in the reconstructed data beam during the data reconstruction mode after said reconstructed data beam has been generated for said playback time.

44. The method of claim 43 wherein the holographic storage media is comprised of a flexible longitudinal holographic storage media having first and second longitudinal edges with the rows disposed parallel and at an angle relative to the edges with the step of controlling operable to incrementally direct the reference beam and the data beam during the record mode, and the reference beam only during the data reconstruction mode, to the select ones of the storage regions in a given row, and, after accessing each of the plurality of storage regions in the given row, incrementally accessing the plurality of storage regions in the next adjacent one of the rows in a sequential manner.

45. The method of claim 44 wherein the step of controlling incrementally moves the flexible longitudinal holographic storage media relative to the reference beam and the data beam for at least the movement of the reference beam and the data beam from one row of the storage regions to an adjacent row of the storage regions.

46. The method of claim 44 wherein the rows of the storage regions are disposed substantially perpendicular to the edges of the flexible longitudinal holographic storage media.

47. The method of claim 44, wherein the longitudinal media comprises a tape, and wherein the tape is wound on two reels and extends therebetween, the step of controlling operable to incrementally feed the tape from one of the reels to the other of the reels.

48. The method of claim 43, wherein the stored pages of holographic recordings are angle multiplexed within each of the storage regions, and wherein the step of directing is operable to incrementally direct the reference beam at one of a plurality of predetermined angles to access the select ones of the holographic recordings associated therewith during the data reconstruction mode and to intersect with the data beam at one of the plurality of predetermined angles during the record mode.

49. The method of claim 48, wherein the step of incrementally directing during the data reconstruction mode is operable to incrementally direct the reference beam at each of the plurality of angles, each of the plurality of angles associated with a separate one of the stored holographic recordings in the select storage region such that substantially all of the stored holographic recordings in the select one of the storage regions are incrementally accessed as a reconstructed data beam.

50. The method of claim 43, wherein the step of directing comprises:

incrementally steering the reference beam to select ones of the storage regions in a given row during the data reconstruction mode, and incrementally steering the reference beam and the data beam to select ones of the storage regions in a given row during the record mode; and moving the holographic storage media incrementally to dispose an entire row of the storage regions in a predetermined window with the step of steering operable within the window.

51. The method of claim 50, wherein the step of controlling is operable to control the step of incrementally steering to access all of the storage regions in the one of the rows within the window in a predetermined order during at least the data reconstruction mode prior to controlling the step of incrementally moving to select the next adjacent row.

52. The method of claim 51, wherein the predetermined order comprises moving from the top to the bottom of the one of the rows disposed in the window.

53. A method for storing and accessing holographic recordings in a holographic storage system, comprising the steps of:

providing a holographic storage media having a top surface and a bottom surface with a plurality of storage regions for storing pages of holographic recordings therein each comprised of an image representing multiple bits of data, the storage regions arranged in parallel rows, each row having the associated storage regions spaced a predetermined distance apart along the associated row;

generating a coherent light beam;

incrementally directing the coherent light beam to substantially and completely illuminate only a select one of the storage regions in a select one of the rows;

splitting the coherent light beam into a first light beam comprising a reference beam and a second light beam;

superimposing data on the second light beam to form a data beam during a record mode, and inhibiting the second light beam during a data reconstruction mode;

incrementally imparting one of a plurality of predetermined angles onto the reference beam and, during the record mode, to intersect with the data beam in the select one of the storage regions at the one of the plurality of predetermined angles for a predetermined amount of record time, the interference of the data beam and the reference beam at the one of the predetermined angles recording an associated interference grating having stored therein information corresponding to the data on the data beam aad, during a data reconstruction operation, incrementally imparting one of the predetermined ad angles to the reference beam to select the one of the recordings in the select storage region associated with the one of the predetermined angles for a predetermined amount of playback time to generate a reconstructed data beam;

controlling the step of directing to sequentially and incrementally access a plurality of the storage regions in a select one of the rows and controlling the step of incrementally imparting to incrementally and sequentially impart one of the plurality of predetermined angles to the reference beam while directed at the select one of the storage regions to sequentially generate the reconstructed data beam; and detecting and extracting the data in the reconstructed data beam during the data reconstruction mode after playback time.

54. The method of claim 53 wherein the holographic storage media is comprised of a flexible longitudinal holographic storage media having first and second longitudinal edges with the rows disposed parallel and at an angle relative to the edges with the step of controlling operable to incrementally direct the reference beam and the data beam during the record mode, and the reference beam only during the data reconstruction mode, to the select ones of the storage regions in a given row, and, after incrementally accessing each of the plurality of storage regions in the given row, accessing the plurality of storage regions in the next adjacent one of the rows in a sequential manner.

55. The method of claim 54 wherein the step of controlling incrementally moves the flexible longitudinal holographic storage media relative to the reference beam and the data beam for at least the movement of the reference beam and the data beam from one row of the storage regions to an adjacent row of the storage regions.

56. The method of claim 54 wherein the rows of the storage regions are disposed substantially perpendicular to the edges of the flexible longitudinal holographic storage media.

57. The method of claim 54, wherein the longitudinal media comprises a tape, and wherein the tape is wound on two reels and extends therebetween, the step of controlling operable to feed the tape from one of the reels to the other of the reels.

58. The method of claim 53, wherein the step of directing comprises:

incrementally steering the coherent light beam to select ones of the storage regions in a given row; and moving the holographic storage media incrementally to dispose an entire row of the storage regions in a predetermined window with the steering system operable within the window.

59. The method of claim 58, wherein the step of controlling is operable to control the step of steering to incrementally access all of the storage regions in the one of the rows within the window in a predetermined order prior to controlling the step of moving to select the next adjacent row.

60. The method of claim 59, wherein the predetermined order comprises moving from the top to the bottom of the one of the rows disposed in the window.

* * * * *

UNITED STATES PATENT AND TRADEMARK OFFICE
CERTIFICATE OF CORRECTION

PATENT NO. : 5,519,517
DATED : May 21, 1996
INVENTOR(S) : Redfield, et al.

It is certified that error appears in the above-indentified patent and that said Letters Patent is hereby corrected as shown below:

Column 6, line 57, replace "minor" with --mirror--.

Column 9, Claim 1, line 47, delete "," following "incrementally".

Column 12, Claim 21, line 54, insert --said-- following "of".

Column 16, Claim 43, line 20, delete ";" and insert therefor --,--.

Signed and Sealed this

Thirty-first Day of December, 1996

Attest:

BRUCE LEHMAN

*Attesting Officer*    *Commissioner of Patents and Trademarks*